(12) United States Patent
Kocer et al.

(10) Patent No.: US 6,428,046 B1
(45) Date of Patent: Aug. 6, 2002

(54) FRONT CRADLE FOR A VEHICLE

(75) Inventors: Bruce Kocer, Oxford; Scott Spicuzza, Sterling Heights; Walter A. Snyder, Plymouth, all of MI (US)

(73) Assignee: The Budd Company, Troy, MI (US)

( * ) Notice: Subject to any disclaimer, the term of this patent is extended or adjusted under 35 U.S.C. 154(b) by 430 days.

(21) Appl. No.: 08/953,606

(22) Filed: Oct. 17, 1997

(51) Int. Cl.$^7$ .............................................. B62D 21/00
(52) U.S. Cl. ...................... 280/781; 280/785; 180/311; 296/204
(58) Field of Search ................................ 280/781, 788, 280/785, 124.109, 93.515; 180/311, 312; 296/204, 205

(56) References Cited

U.S. PATENT DOCUMENTS

| 1,996,827 A | | 4/1935 | Olley |
| 2,100,561 A | | 11/1937 | Kliesrath |
| 2,177,896 A | | 10/1939 | Lee |
| 2,189,719 A | * | 2/1940 | Wallace ....................... 280/781 |
| 2,646,992 A | | 7/1953 | Straussler |
| 2,809,050 A | | 10/1957 | Bauer |
| 2,837,347 A | | 6/1958 | Baremyi |
| 2,880,013 A | | 3/1959 | Dean |
| 2,901,266 A | * | 8/1959 | Lindsay ....................... 280/785 |
| 3,799,283 A | | 3/1974 | Freber |
| 4,045,075 A | | 8/1977 | Pulver |
| 4,465,300 A | * | 8/1984 | Raidel, Sr. ................... 280/725 |
| 4,781,398 A | * | 11/1988 | Uebelstadt et al. .......... 280/784 |
| 4,799,708 A | | 1/1989 | Handa et al. |
| 5,020,847 A | | 6/1991 | Shih |
| 5,213,386 A | | 5/1993 | Janotik et al. |
| 5,280,957 A | * | 1/1994 | Hentschel et al. ........... 280/788 |
| 5,385,369 A | | 1/1995 | Mukai et al. |
| 5,454,453 A | * | 10/1995 | Meyer et al. ................ 180/377 |
| 5,557,961 A | * | 9/1996 | Ni et al. .......................... 72/61 |
| 5,641,180 A | * | 6/1997 | Kamei et al. ................ 280/781 |
| 5,882,039 A | * | 3/1999 | Beckman et al. ............ 280/781 |
| 5,884,722 A | * | 3/1999 | Durand et al. ............... 180/312 |

* cited by examiner

Primary Examiner—Eric Culbreth
Assistant Examiner—David R. Dunn
(74) Attorney, Agent, or Firm—Harness, Dickey & Pierce, P.L.C.

(57) ABSTRACT

A frame assembly is provided for a vehicle. The frame assembly includes a pair of frame rails and a subframe disposed between the frame rails. The subframe includes a unitary, generally U-shaped cradle including a front cross member and a pair of side members extending from the front cross member. A pair of front attachment members extend from a front portion of the cradle and attach to the frame rails. A pair of rear attachment members extend from a rear portion of the cradle and attach to the frame rails.

8 Claims, 3 Drawing Sheets

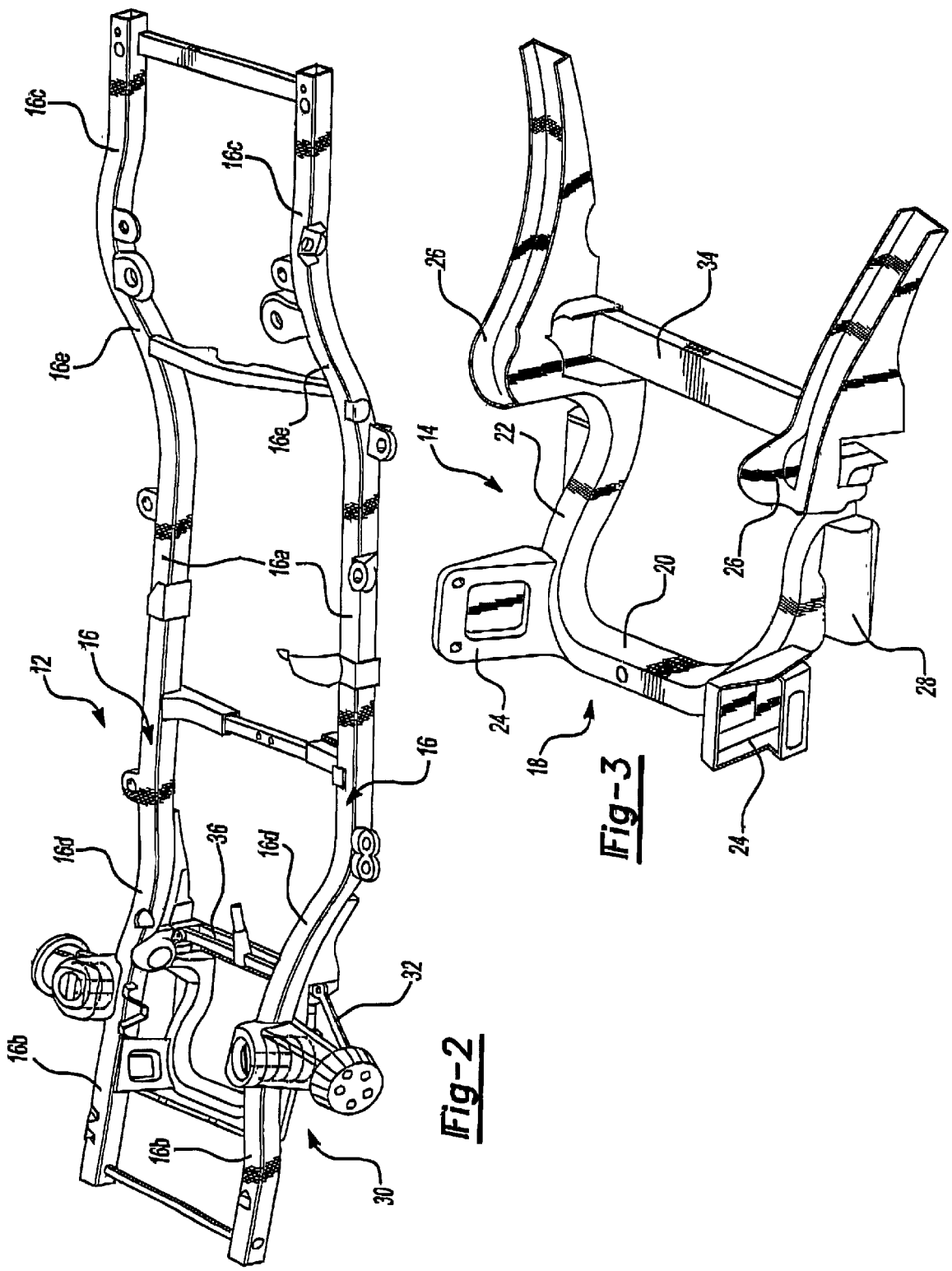

FRONT CRADLE FOR A VEHICLE

BACKGROUND OF THE INVENTION

1. Field of the Invention

The present invention relates generally to vehicle frame structures. More specifically, the invention relates to vehicle subframe structures for front suspension systems.

2. Background and Summary of the Invention

In order to increase the structural stiffness of a vehicle frame assembly, one or more subframes are rigidly attached between the left and right frame rails of a vehicle. A vehicle frame will commonly include a front subframe located beneath the engine. The vehicle frame rails extend in a longitudinal direction to the vehicle body while the front subframe spans between the left and right frame rails in a transverse direction to the vehicle body. The front subframe is commonly used as a mounting structure for vehicle suspension components.

Because of the weight of the engine and loads from the front suspension system, the vehicle frame rails have a tendency to roll inward. If the frame rails are allowed to roll, a reduction in the effectiveness of the vehicle suspension and steering systems will result. By rigidly connecting a front subframe to the left and right frame rails, greater resistance to frame rail roll is effected. In order to increase the stiffness provided by the front subframe, a cross member may also be included in the vehicle frame assembly. The cross member is also rigidly attached to and disposed between the left and right vehicle frame rails near the front subframe. Although the addition of a cross member results in a more rigid frame assembly, there are deficiencies with this design.

The vertical mounting location of the lower control arm is dictated by the front suspension system design and vehicle ground clearance requirements. In order to provide the required clearances, the attachment points of the lower control arms must be a sufficient vertical distance below the vehicle frame rails. However, as the vertical distance between the attachment point of the lower control arm and the center line of the vehicle frame rails increases, the resulting bending mount on the subframe increases. As the bending moment applied to the subframe increases, a proportional increase in the inward frame rail roll results. Therefore, there is a demand for an improved front subframe which allows for suspension component attachment while also providing increased strength to the vehicle frame assembly.

Another deficiency with the conventional frame-assembly design is in the event of an offset front end collision. Current frame assembly designs that include a front subframe have a tendency to distort diagonally in the event of an offset front end collision. In the event of a disproportionate load distribution between the frame rails having a subframe that is attached to each frame rail at one point, the subframe and frame rails will pivot about the single attachment point instead of transferring the load. When an impact occurs that results in a disproportionate amount of force distributed between the two frame rails, such as an offset front end collision, the frame rail receiving the greater amount of force will be thrust in the direction of the force. The result is that frame rail receiving the greater amount of force will be translated further than its counterpart. Therefore, the frame assembly distorts diagonally instead of transferring the load.

The addition of a cross member does not remedy the situation since the point where the cross member is attached to the frame will also pivot. Greater resistance to distortion is achieved by the addition of the cross member, but current frame assemblies are in need of improvement.

Accordingly, it is an object of the present invention to provide a subframe which includes a unitary front cradle that by design improves frame assembly function by reducing frame rail roll.

It is a further object of the present invention to provide a subframe which includes a unitary front cradle with a plurality of attaching points to provide additional stiffness in the event of a front end collision.

It is still another object of the present invention to provide a subframe which includes a unitary front cradle that provides means for deflecting objects in the path of the vehicle.

Accordingly, the present invention provides a frame assembly having a pair of frame rails and a subframe. The subframe has a generally U-shaped cradle that includes a front cross member and a pair of side members extending from the front cross member wherein the side members are angled downward from the front cross member. The front cross member and pair of side members are formed as a unitary (one-piece) cradle. A pair of attachment members extend in a generally vertical direction from the front cross member whereby the unitary cradle is adapted to be attached to the vehicle frame rails at the front cross member by the pair of front attachment members. A pair of rear attachment members extend in a generally vertical direction from a rear portion of the side members whereby the cradle is also adapted to be attached to the vehicle frame rails at a rear portion of the side members by the pair of rear attachment members. A pair of lower control arm mounts are suitably attached to a rear lateral portion of each pair of side members. A rear cross member is suitably attached at a rear portion of the side members and is removable. A steering gear is mountable to the rear cross member and a stabilizer bar mount is suitably embodied at a front portion of the unitary cradle.

A skid plate may be attached to a bottom surface of the unitary front cradle.

From the subsequent detailed description taken in conjunction with the accompanying drawings and subjoined claims, other objects and advantages of the present invention will become apparent to those skilled in the art.

BRIEF DESCRIPTION OF THE DRAWINGS

The present invention will become more fully understood from the detailed description and the accompanying drawings, wherein:

FIG. 2 is a perspective view of a vehicle frame and suspension system including a front subframe according to the principles of the present invention;

FIG. 3 is a perspective view of the front subframe according to the principles of the present invention;

DESCRIPTION OF THE PREFERRED EMBODIMENT

Figure 1:
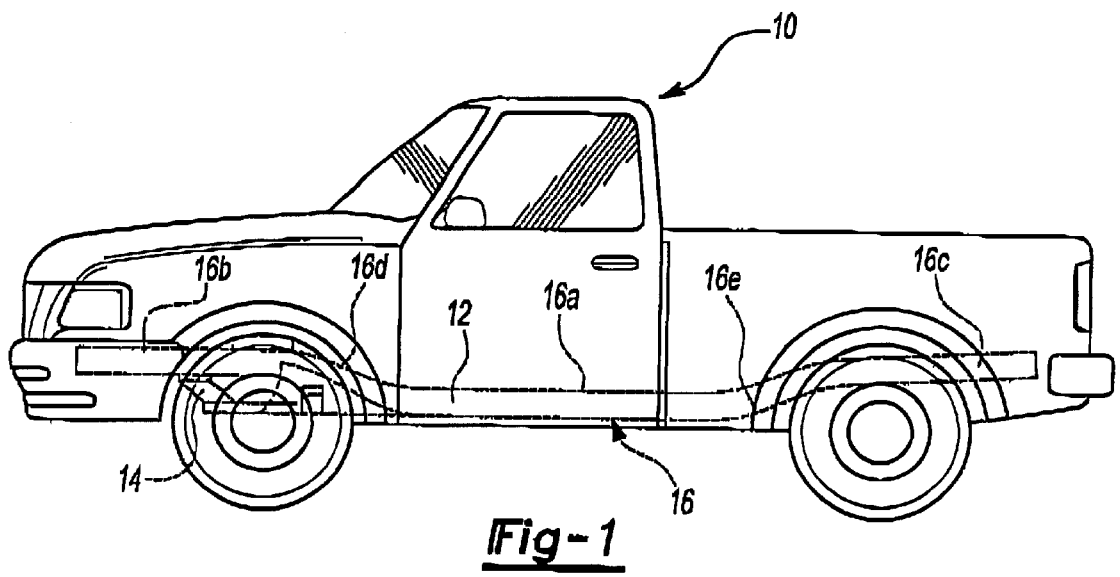
FIG. 1 is a side view of a pick-up truck showing a vehicle frame according to the principles of the present invention in phantom.
Figure 4:
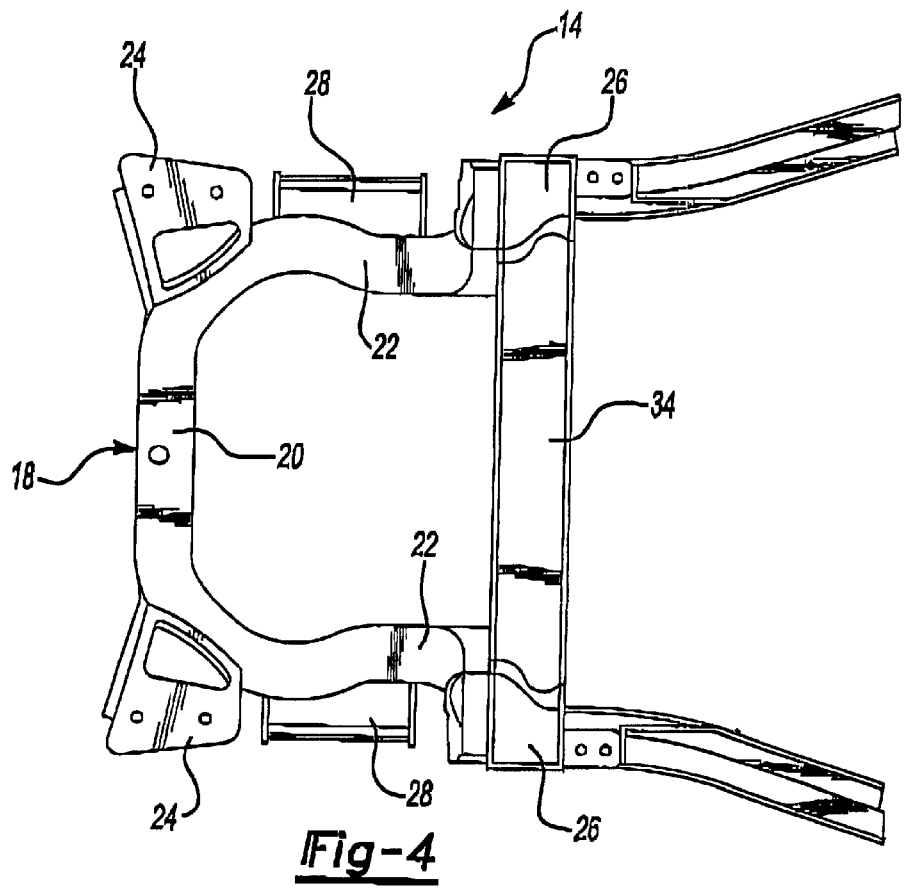
FIG. 4 is a plan view of the front subframe according to the principles of the present invention.

Referring to the drawings, and in particular FIG. 1, a vehicle 10, for instance a pick-up truck is shown having a frame assembly 12, shown in phantom lines, in a typical vehicle location. Frame assembly 12 includes a front subframe 14 also shown in phantom. Referring now to FIGS. 2 and 3, the front subframe 14 is attached to a pair of frame rails 16 which extend in a longitudinal direction to the vehicle 10 and the subframe 14 extends transversely to the frame rails 16. The subframe 14 includes a unitary front cradle 18. Front cradle 18 includes a front cross member 20 and a pair of side member 22 extending from the front cross member 20. The front cradle 18 is unitary by the fact that it is manufactured from a single piece of material. It should be appreciated that the material may be steel, aluminum, or any suitable material found in the art. The initial shape of a section of the material may be hollow or solid in nature. Furthermore, the unitary cradle 18 is preferably manufactured by hydroforming but may be manufactured by any known manufacturing process in the art.

The frame rails 16 each have a mid-section 16a, a front section 16b, and a rear section 16c. The front section 16b is attached to the mid-section 16a by downwardly sloping intermediate section 16d and the rear section is attached to the mid-section 16a by a downwardly sloping intermediate section 16e. The front section 16b and rear section 16c are each disposed in a generally horizontal plane that is higher than the mid-section 16a.

The subframe 14 also includes a pair of front attachment members 24 and a pair of rear attachment members 26. The front attachment members 24 and rear attachment members 26 are preferably attached to the front cradle 18 by welding. However, it should be understood that any suitable attachment means can be utilized. The subframe 14 is attached to the vehicle frame rails 16 by the front attachment members 24 and by rear attachment members 26. The rear attachment members 26 are attached to the intermediate section 16d of the frame rails 16. Front and rear attachment members 24, 26 may be attached to the frame rails 16 by any suitable means known in the art. However, for purposes of strength, welding is the preferred method.

The subframe 14 also includes a pair of lower control arm mounts 28 which are suitably attached to the rear lateral portion of each of the side members 22. The lower control arm mounts 28 are adapted to be attached to a component of the suspension system 30, an example of which being the lower control arm 32. The side members 22 are downwardly angled relative to the front cross member 20. The downwardly angled side members 22 provide suitable space for packaging the suspension system 30 while also providing suitable ground clearance for the vehicle frame assembly 12. By having the front cross member 20 and a forward portion of the pair of side members 22 located as close to the vehicle frame rails 16 as possible, the frame assembly 12 is provided with additional stiffness.

Furthermore, since the subframe 14 is comprised of a unitary front cradle 18 which is attached at four points by the front attachment members 24 and the rear attachment members 26, a significantly stronger frame assembly 12 results than that which has been found in the prior art. This is accomplished by spreading out the attachment points of the front attachment members 24 and rear attachment members 26. In the event of a front end collision where the impact is offset to one side of the vehicle 10, the cradle 18 acts as a solid unit dispersing the load to each of the frame rails 16. Furthermore, the likelihood of pivoting is significantly reduced, since the side members 22 of unitary front cradle 18 are attached at two points on each of the pair of frame rails 16.

Inherent in the design of the front cradle 18 is the capability to optimize the performance of front cradle 18 by varying the shape of the cross section. Sections of the front cradle 18 which are subject to higher vertical loads are made taller and narrower. Likewise, areas that are more subject to lateral loads may be made wider and flatter. This optimization is further enhanced by implementing hydroform manufacturing technology. Hydroform allows the shape of the front cradle 18 to conform to a pattern through hydraulic pressure, thereby achieving contours that would otherwise be impossible to manufacture.

Figure 5:
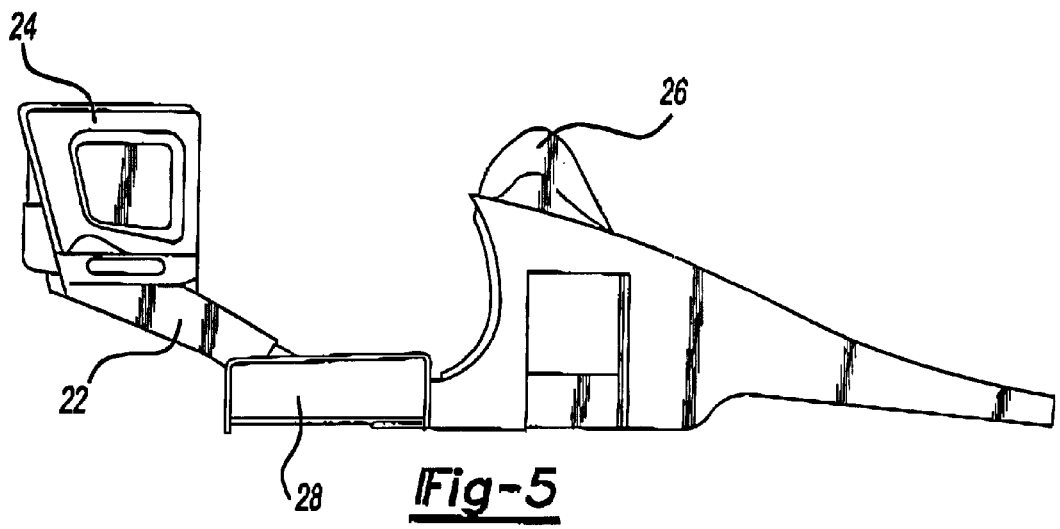
FIG. 5 is a side view of the front subframe according to the principles of the present invention.
Figure 6:
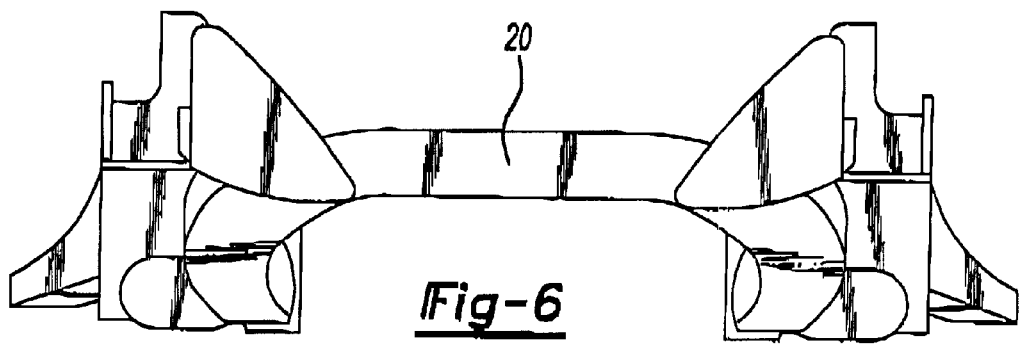
FIG. 6 is a front view of the front subframe according to the principles of the present invention.

The front cradle 18 also provides for an optimal mounting position for the lower control arm mounts 28. The front cradle 18 is optimized by having the side members 22 at the same vertical location as the lower control arm mounts 28. The location of the lower control arm mounts 28 are optimized by the fact that they are as close to the side members 22 as possible, thereby minimizing the bending moment resulting from vertical forces generated by the vehicle suspension system 30. The lower control arms 32 also apply a lateral load to lower control arm mounts 28. The rear component of the lateral loads accounts for approximately 80 to 85 percent of the total lateral loading. Because of the disproportional load that the lower control arm mounts 28 experience, the side members 22 need to be sufficiently rigid. As can be seen in FIG. 5, the lower control arm mounts 28 are mounted on side members 22 near the rear attachment members 26. This allows for the rear lateral loads imparted by the lower control arms 32 to be absorbed by the vehicle frame rail 16 through the rear attachment members 26. In order to strengthen the side members 22 when subject to vertical loads transferred from the front suspension system 32, a gusset, not shown, may be rigidly attached, preferably by welding, to the inside of the side members 22 proximal to the lower control arm mounts 28. The gussets are designed to reinforce the hollow side members 22 in order to prevent buckling of the side members under load.

Subframe 14 is additionally strengthened by the presence of a rear cross member 34 which may be rigidly attached to a rear portion of the side members 22 or to the rear attachment members 26 by any suitable means, including fasteners. In the present invention, the rear cross member 34 is attached by fasteners and is removable. The rear cross member 34 provides additional rigidity to the front cradle 18 which can be appreciated when considering the aforementioned rear lateral loads imparted by the lower control arm 32 of the front suspension system 30 or from a front end collision. The rear cross member 34 further provides a surface to mount a steering gear 36, as shown in FIG. 2.

Figure 7:
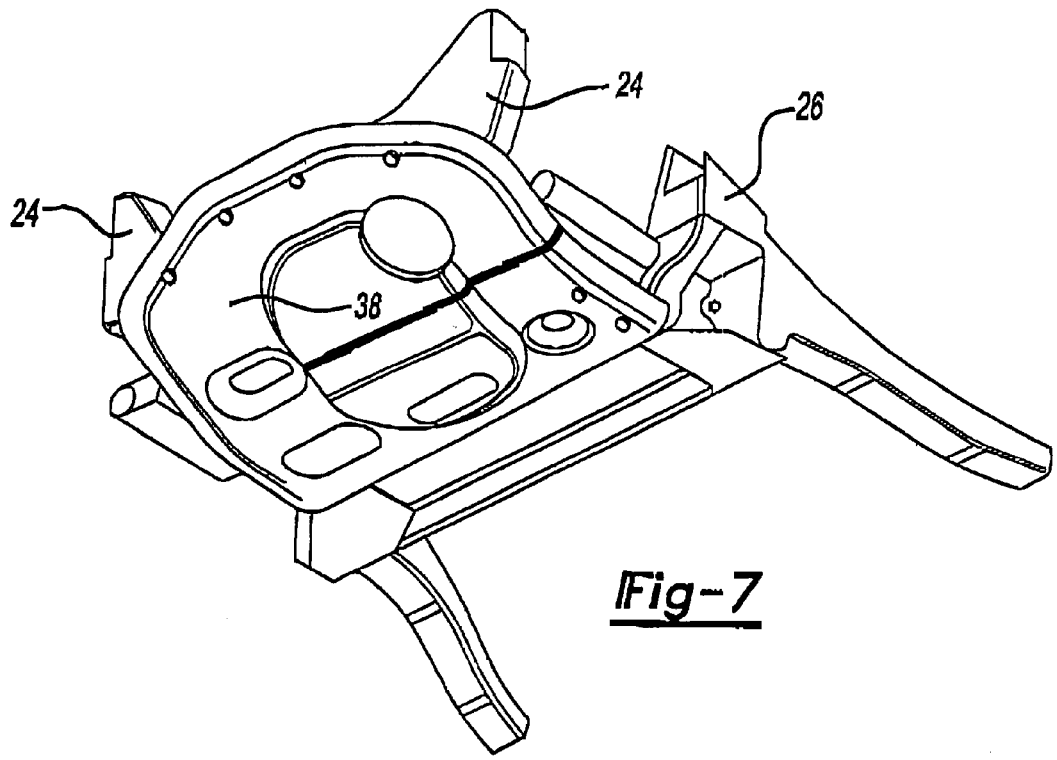
FIG. 7 is a perspective view of a variant of a cradle according to the present invention including a skid plate, the subframe shown attached to a pair of frame rails.

Referring now to FIGS. 1 and 5–7, front cradle 18 of subframe 14 provides an additional safety feature. The side members 22 of front cradle 18 are angled downward from front cross member 20 to rear attachment members 26, forming an angle generally but not limited to 20 to 30°. In the event that vehicle 10 encounters an obstruction in the road, such as a railroad tie or a stump, the downwardly angled geometry of front cradle 18 provides a deflection surface whereby the vehicle 10 can traverse and/or deflect the object thereby avoiding damage to the vehicle underbody. As shown in FIG. 7, a skid plate 38 may be integrated into the front cradle 18 in order to provide additional protection to components in the engine compartment, specifically the engine oil pan. The engine compartment, not identified specifically indicated in the drawings, is generally located above the subframe 14 in vehicle 10. The ability of a vehicle 10 to traverse an object in its path is further aided by the front subframe being attached at four points, specifically front attachment members 24 and rear attachment members 26. Having a four-point connection provides the capability of lifting the vehicle frame assembly 12 when the front cradle 18 makes contact with an obstruction, rather than the frame assembly 12 deflecting or pivoting as described above.

It is understood that many modifications and variations of the present invention are possible in light of the above teachings. Therefore, any other embodiments which fall within the scope and spirit of the present invention are intended to be covered by the following claims.

What is claimed is:

1. A frame assembly of a vehicle comprising:

a pair of frame rails, said frame rails each having a mid section and front and rear sections, said front section being connected to said mid-section by a downwardly sloping intermediate section such that said front section is disposed in a generally horizontal plane that is higher than said mid-section;

a subframe having a generally U-shaped unitary cradle, said generally U-shaped unitary cradle including a front cross member and a pair of side members extending from said front cross member;

a pair of front attachment members extending in a generally vertical direction from a front portion of said unitary cradle, said front attachment members being attached to the vehicle frame rails;

a pair of rear attachment members extending in a generally vertical direction from a rear portion of said side members, said rear attachment members being attached to the downwardly sloping intermediate section of said vehicle frame rails.

2. The frame assembly of claim 1, further comprising a pair of lower control arm mounts attached to a rear lateral portion of each of said pair of side members.

3. The frame assembly of claim 1, further comprising a rear cross member attached to a rear portion of each of said side members.

4. The frame assembly of claim 1, wherein said front attachment members extend in a generally vertical direction from said front cross member and said rear attachment members extend in a generally vertical direction from a rear portion of said side members.

5. The frame assembly of claim 4, further comprising a pair of lower control arm mounts attached to a rear lateral portion of said side members and a rear cross member attached to a rear portion of at least one of said side members.

6. The frame assembly of claim 5, wherein said rear cross member is removable.

7. The frame assembly of claim 5, further comprising a steering gear mounted to said rear cross member.

8. The frame assembly of claim 1, further comprising a skid plate attached to a bottom surface of said cradle.

* * * * *